United States Patent
Yang et al.

(10) Patent No.: US 9,407,702 B2
(45) Date of Patent: Aug. 2, 2016

(54) METHOD AND APPARATUS FOR BRIDGING COMMUNICATION SESSIONS

(75) Inventors: Ning Yang, Beijing (CN); Juntao Zhen, Beijing (CN)

(73) Assignee: Nokia Technologies Oy, Espoo (FI)

( * ) Notice: Subject to any disclaimer, the term of this patent is extended or adjusted under 35 U.S.C. 154(b) by 774 days.

(21) Appl. No.: 13/806,409

(22) PCT Filed: Jun. 21, 2010
(Under 37 CFR 1.47)

(86) PCT No.: PCT/CN2010/074127
§ 371 (c)(1),
(2), (4) Date: Jun. 17, 2013

(87) PCT Pub. No.: WO2011/160273
PCT Pub. Date: Dec. 29, 2011

(65) Prior Publication Data
US 2014/0115170 A1    Apr. 24, 2014

(51) Int. Cl.
*G06F 15/16* (2006.01)
*H04L 29/08* (2006.01)
*H04W 4/00* (2009.01)

(52) U.S. Cl.
CPC .............. *H04L 67/141* (2013.01); *H04L 67/14* (2013.01); *H04W 4/00* (2013.01); *H04W 4/003* (2013.01)

(58) Field of Classification Search
USPC .................. 709/204, 205, 206, 227, 228, 229
See application file for complete search history.

(56) References Cited

U.S. PATENT DOCUMENTS

| 2003/0115203 | A1* | 6/2003 | Brown et al. ................... 707/10 |
| 2008/0056235 | A1 | 3/2008 | Albina et al. |
| 2009/0198780 | A1* | 8/2009 | Koch ............................ 709/206 |
| 2010/0005288 | A1 | 1/2010 | Rao et al. |
| 2010/0251177 | A1* | 9/2010 | Geppert et al. ............... 715/821 |
| 2010/0251380 | A1* | 9/2010 | Zhang et al. ................... 726/26 |

FOREIGN PATENT DOCUMENTS

| EP | 2036235 A2 | 3/2009 |
| EP | 2148489 A1 | 1/2010 |
| WO | WO 2006012610 A2 | 2/2006 |
| WO | WO 2007/149625 A2 | 12/2007 |

OTHER PUBLICATIONS

International Search Report for PCT/CN2010/074127 issued Mar. 31, 2011.

(Continued)

*Primary Examiner* — Liangche A Wang
(74) *Attorney, Agent, or Firm* — Ditthavong & Steiner, P.C.

(57) ABSTRACT

An approach is provided for bridging communication sessions among multiple devices. A communication bridging platform determines to receive a request for establishing a communication session between a first device and a second device. The request specifies, at least in part, a third device with a first static link to the first device and a second static link to the second device. The communication bridging platform determines to establish a temporary link between the first device and the second device via the first static link and the second static link, and then determines to conduct the communication session over the temporary link.

17 Claims, 9 Drawing Sheets

(56) References Cited

OTHER PUBLICATIONS

Rosenberg, J. et al. Best Current Practices for Third Party Call Control (3pcc) in the Session Initiation Protocol (SIP). IETF. Request for comments:3725. http://www.ietf.org/rfc/rfc3725.txt Apr. 2004, the whole document.

Extended European Search Report for related application 10853416.5, dated Apr. 2, 2014, 6 pages.

Office Action for corresponding Chinese Application No. 201080067428.8, dated Oct. 20, 2014, 15 pages (English Language Summary Included).

Office Action for corresponding Chinese Patent Application No. 201080067428.8, dated Jul. 13, 2015. 11 pages.

* cited by examiner

METHOD AND APPARATUS FOR BRIDGING COMMUNICATION SESSIONS

BACKGROUND

Wireless (e.g., cellular) service providers and device manufacturers are continually challenged to deliver value and convenience to consumers by, for example, providing compelling network services. One area of interest has been in the development of means for facilitating communications among an increasingly connected community of users. For example, it is noted that the number and variety of available forms of communications (e.g., voice calls, text messaging, e-mails, interactive chats, social networking, etc.) has increased greatly. This increase, however, has also made it more difficult for users to manage and share contact information across the various means of communications. Accordingly, service providers and device manufacturers face significant technical challenges to enabling users to more easily interact over the various means of communications.

SOME EXAMPLE EMBODIMENTS

Therefore, there is a need for an approach for efficiently and conveniently facilitating communications by bridging communication sessions among multiple devices.

According to one embodiment, a method comprises determining to receive a request for establishing a communication session between a first device and a second device. The request specifies, at least in part, a third device with a first static link to the first device and a second static link to the second device. The method also comprises determining to establish a temporary link between the first device and the second device via the first static link and the second static link. The method further comprises determining to conduct the communication session over the temporary link.

According to another embodiment, an apparatus comprising at least one processor, and at least one memory including computer program code for one or more computer programs, the at least one memory and the computer program code configured to, with the at least one processor, cause the apparatus to determine to receive a request for establishing a communication session between a first device and a second device. The request specifies, at least in part, a third device with a first static link to the first device and a second static link to the second device. The apparatus is also caused to determine to establish a temporary link between the first device and the second device via the first static link and the second static link. The apparatus is further caused to determine to conduct the communication session over the temporary link.

According to another embodiment, a computer-readable storage medium carrying one or more sequences of one or more instructions which, when executed by one or more processors, cause an apparatus to receive a request for establishing a communication session between a first device and a second device. The request specifies, at least in part, a third device with a first static link to the first device and a second static link to the second device. The apparatus is also caused to determine to establish a temporary link between the first device and the second device via the first static link and the second static link. The apparatus is further caused to determine to conduct the communication session over the temporary link.

According yet to another embodiment, an apparatus comprises means for determining to receive a request for establishing a communication session between a first device and a second device. The request specifies, at least in part, a third device with a first static link to the first device and a second static link to the second device. The apparatus also comprises means for determining to establish a temporary link between the first device and the second device via the first static link and the second static link. The apparatus further comprises means for determining to conduct the communication session over the temporary link.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

A method and apparatus for bridging communication session among multiple devices are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to bridging voice and text-based communications among various devices, it is contemplated that the approach described herein is applicable to any other form or means of communications available over a communication network.

Figure 1:
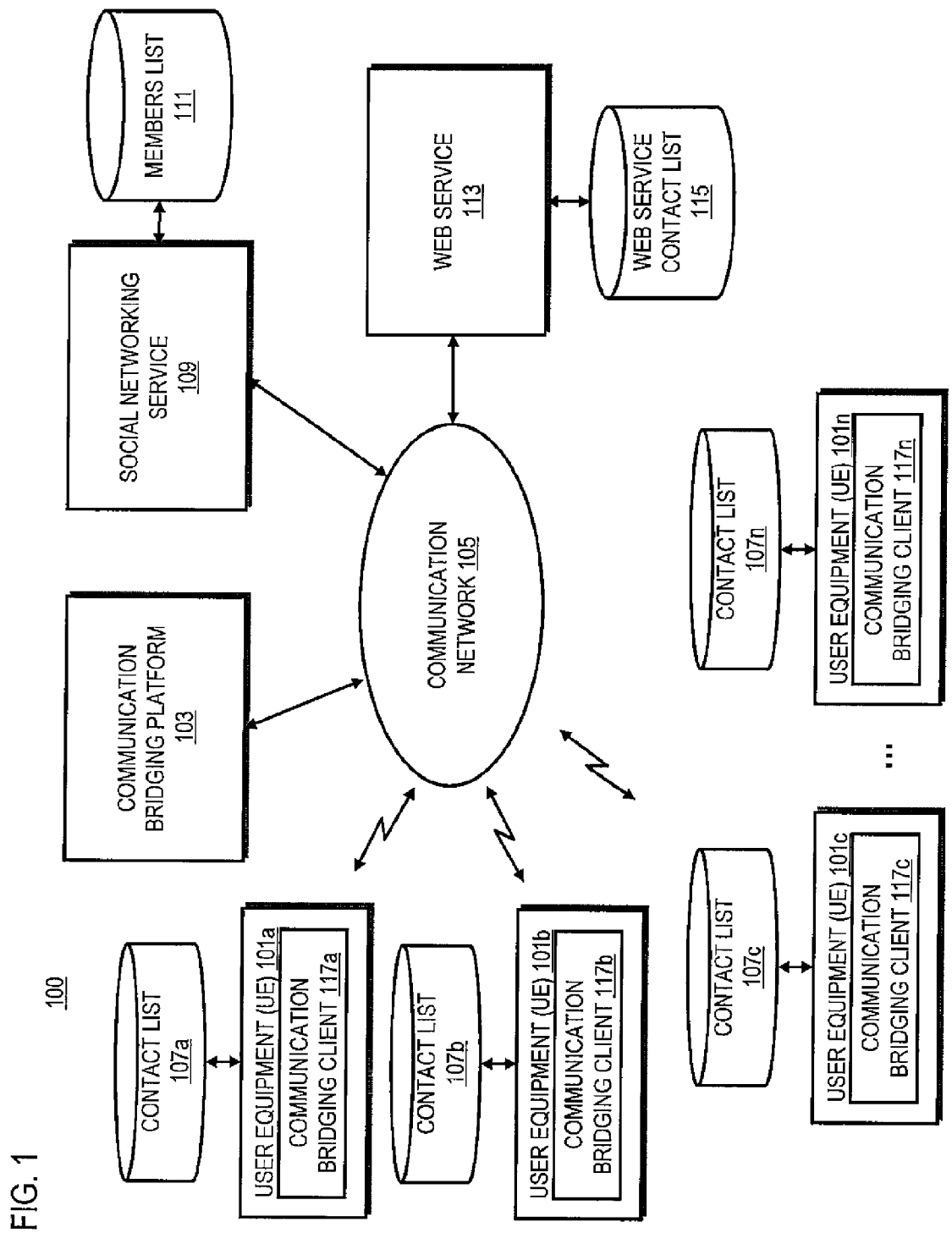
FIG. 1 is a diagram of a system capable of bridging communication sessions among multiple devices, according to one embodiment.

FIG. 1 is a diagram of a system capable of bridging communications among multiple devices, according to one embodiment. As noted previously, modern communication networks provide users with a variety of ways to communicate (e.g., voice calls, electronic mail, instant messages, text messages, multimedia messages, social networking communication sessions, chat sessions, video calls, etc.). Consequently, users are discovering that their contacts are becoming increasingly spread across these multiple means of communication and corresponding services (e.g., social networking services, communication services, navigation services, media services, etc.), applications (e.g., personal information managers, calendars, mail clients, etc.), and devices (e.g., desktop computer, laptop computer, Internet nodes, communicators, personal digital assistants, etc.). For example, in a typical case, a user may have multiple sets of contacts (e.g., friends) stored in any number of places, such as (1) a first social networking service (e.g., MySpace®), (2) a second social networking service (e.g., Facebook®), (3) a personal information management web service (e.g., Ovi®), (4) the user's mobile device, and (5) an E-mail application running on the user's personal computer.

Traditionally, each service or application manages its respective set of contacts or contact lists independently. As used herein, the term "contact list" includes, for instance, a directory of names, communication identifiers (e.g., telephone number, E-mail address, screen name, etc.), and other related information (e.g., location, hobbies, interests, characteristics, etc.) contained in a mobile device, a web service, social networking service, and/or the like. For each respective service, the user generally generates the corresponding contact list manually adding contacts, importing contacts from other sources, requesting contact information for others, and the like. For example, contact lists may be designed to support end-to-end communications where the originating device (e.g., device initiating a communication session) knows the contact information (e.g., a telephone number) of the terminating device (e.g., device to which a communication session is directed). In other words, to establish a call between the originating device and the terminating device, the originating device often uses a static link to support the call. As used herein, the term "static link" refers to when the originating device uses a static communication identifier (e.g., the telephone number) of the terminating device to establish the communication. By way of example, this communication identifier is often stored in the contact list of the originating device.

However, it is quite common for the originating device to not have or know the static communication identifier of the terminating device, particularly when the originating device communicates only occasionally with the terminating device. In this case, the user of the originating device typically has to ask for the communication identifier of the terminating device from a friend, a directory service, or other third party; store the communication identifier in a contact list (e.g., to build the static link); and then initiate the communication session to the terminating device. In another example with respect to an instant messaging (IM) service, an originating device may have to ask for the IM identifier of a user of a terminating device from a common friend to initiate an IM session. Furthermore, when conducting the session itself, the user of the originating device often has to explain how the communication identifier was obtained (e.g., "got your IM name from John") before continuing with the communication. These steps can be tedious and make the user experience in conducting such occasional or non-routine communications difficult, thereby discouraging the user from such communications. However, it is noted that such communications (e.g., occasional or introductory communications) are often an important first step to building up a social network of friends through common acquaintances or friends.

To address this problem, a system 100 of FIG. 1 introduces the capability to bridge a communication session between a first device and a second device through a third device that has a static link with each of the first device and the second device. In other words, on receiving a request to initiate a communication session between two devices that, for instance, do not have direct static links, the system 100 can nonetheless establish the requested communication by bridging a communication session between the two specified devices through a third device common to the two devices. More specifically, in one scenario, the first device is the originating device of a communication request, the second device is the terminating device, and the third device is a bridging or mediating device that has static links to both the originating device and the terminating device.

In one embodiment, to establish a communication session between the originating device and the terminating device, the system 100 first uses a static link between the bridging device and the originating device to automatically send a temporary communication identifier associated with the terminating device to the originating device. At the same, the system 100 uses a static link between the bridging device and the terminating device to send a temporary communication identifier associated with the originating device to the terminating device. The exchange of respective communication identifiers over the static links of the bridging device enables the originating device and the terminating device to establish a temporary communication link. Moreover, the respective temporary communication identifiers enable each of the originating device and the terminating device to recognize each other over the temporary link without needing to reveal the permanent or actual communication identifiers associated with each device. In some embodiments, the temporary identifiers may also be used to indicate respective relationships of the originating device and/or the terminating device with the bridging device (e.g., that the temporary link is established via a bridging device associated with a user who is a common friend of the respective users of the originating and terminating devices).

In one embodiment, the temporary communication identifiers are valid only for use over the temporary link to maintain, for instance, the privacy of the originating and/or terminating devices. In either one or both of the originating and terminating devices accepts the temporary communication link, the communication session is established between the originating and terminating devices. In yet another embodiment, on approval of the originating device and/or the terminating device, the system 100 can convert the temporary link into a static link by, for instance, providing the respective permanent communication identifiers (e.g., telephone numbers, chat names, e-mail addresses, user names, etc.). In certain embodiments, the permanent communication identifiers can be stored as permanent contacts in the respective contact lists of the originating and/or terminating devices. In the approach described herein, the exchange and/or storage of the permanent communication identifiers constitutes the establishment of static link between the originating and terminating devices. The system 100, therefore, advantageously reduces the burden associated with traditional processes for discovering and establishing communication links between devices with no previously established static links.

In yet another embodiment, the system 100 can maintain a database of contact lists associated with a group of devices to assist the devices in determining candidate bridging devices for a given set of originating and terminating devices. By way of example, on receipt of a request to establish a communication between the set of originating and terminating devices, the system 100 can query the database for a bridging device with appropriate static links. Although the various embodiments are described herein with only a single degree of separation between the bridging device and the originating and terminating devices, it is contemplated that any degree of separation (e.g., to bridge a communication session over multiple bridging devices) can be specified. Moreover, although the various embodiments are discussed with respect to a single originating device and a single terminating device, it is contemplated that the approach described is applicable to establishing a communication session among any number of originating and/or terminating devices.

In addition or alternatively, on receiving a request to establishing a communication session among originating and terminating devices, the system 100 can scan the contact lists of the originating and/or terminating devices and send requests to one or more contacts in the list to determine whether the contacts are able to act as a bridging device.

In one embodiment, the system 100 provides a graphical user interface (GUI) for initiating a request to bridge a communication session among multiple devices. By way of example, the GUI may provide a graphical representation of available contacts whereby a user can drag and drop the contacts to initiate the request. In one sample use case, a "drag and drop" interaction is provided between two contacts of a social networking contact list. The interaction can initiate one temporary link created from a dragged contact to the dropped contact, and/or vice versa. Such temporary links can be saved as a static link when the dropped contact answers and/or approves the communication. In another sample use case, Mark has John and Mary in his IM contact list. Mark drags John's icon and drops it on Mary's icon in a GUI depicting the contact list. Then, John can initiate communication with Mary instantly over the IM application using temporary identifiers and links. If Mary answers or approves, John can have Mary added instantly, as a stationary link, to his IM contact list, and Mary also in the same way.

As shown in FIG. 1, the system 100 comprises user equipment (UEs) 101a-101n (also collectively referred to as UEs 101) having connectivity to a communication bridging platform 103 via a communication network 105. The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In exemplary embodiments, the UEs 101a-101n have connectivity to respective databases 107a-107n of one or more contact lists (also collectively referred to as contact list databases 107). The contact list databases 107 may include, for instance, any number of fields, including, for example, name of contact, telephone number, E-mail address, and other related information fields. Moreover, the contact lists may be associated with the UE 101 itself or with one or more applications running on the UE 101.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 also have connectivity to a social networking service 109 through the communication network 105. In one embodiment, the social networking service 109 may be provided by either the operator of the communication network 105 or a third party (not shown). By way of example, the social networking service 109 enables users to form online communities for sharing common interests (e.g., hobbies, work, family, organizations, etc.). A user of the social networking service 109 can use the service 109 to, for instance, form relationships and communicate with other members of the service. Historically, there have been a variety of social networking services 109 available to users (e.g., MySpace®, Facebook®, LinkedIn°, etc.) catering to various interests. Accordingly, it is not uncommon for users to belong to multiple social networking services 109. The social networking service 109 includes, at least in part, a database 111 of one or more members lists (or contact lists) associated with the social networking service 109. The members list database 111 stores, for instance, a list of registered members of the service 109.

As shown in FIG. 1, the UEs 101 further have connectivity to a web service 113 via the communication network 105. In various embodiments, the web service 113 enables the UE 101 to communicate using and/or synchronize an existing contact list (e.g., the contact list database 107) or create a new contact list in the web service contact list database 115. For example, the web service 113 may provide for online personal information management and communications (e.g., Google®, Yahoo®) including management of user contacts. It is contemplated that the web service 113 may be any service including at least in part a contact list for use in communicating over any number of communication mechanisms (e.g., e-mail, instant messaging, video calling, etc.). In addition, through connectivity to the communication network 105, the communication bridging platform 103 also has connectivity to the social networking service 109 and the web service 113 and can bridge communication sessions conducted over the services 109 and 113.

In this way, the communication bridging platform 103 has access to the contact list databases 107 of the UEs 101, the members list database 111 of the social networking service 109, and the web service contact list database 115 of the web service 113 to enable bridging of corresponding communication sessions. It is contemplated that the communication network 105 may include multiple social networking services 109 or web services 113. Moreover, the communication bridging platform 103 may be implemented as a stand-alone service on the network side of the communication network 105 (as shown in FIG. 1). In addition or alternatively, the communication bridging platform 103 may be implemented in the UEs 101, the social networking service 109, and/or the web service 113.

In one embodiment, the UEs 101*a*-101*n* may execute respective communication bridging client applications 117*a*-117*n* to perform all or a portion of the functions of the communication bridging platform 103. In this way, the approach described herein for bridging communication sessions can be performed by the communication bridging platform 103 or by one or more of the bridging client applications 117 of the originating UE 101*a*, the terminating UE 101*b*, and/or the bridging UE 101*c*.

In another embodiment, the communication bridging client application 117 and the communication bridging platform 103 may interact according to a client-server model. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

By way of example, the UEs 101, the communication bridging platform 103, the social networking service 109, and the web service 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
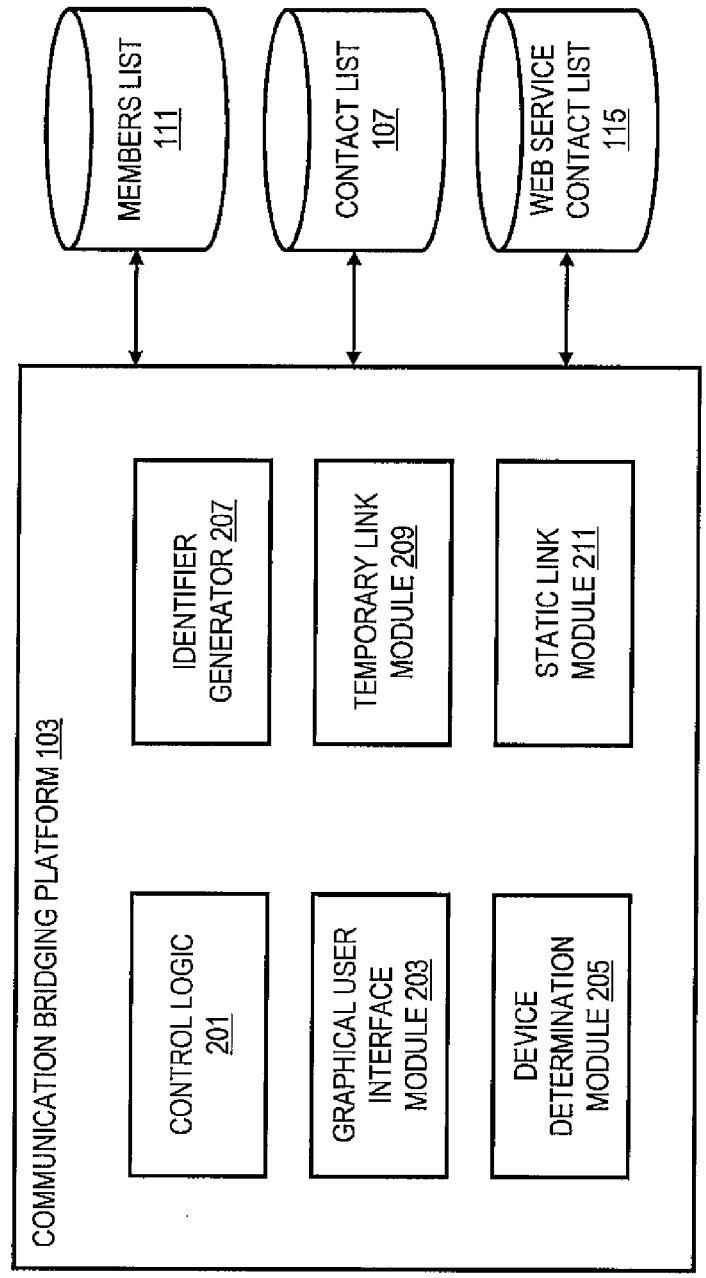
FIG. 2 is a diagram of the components of a communication bridging platform, according to one embodiment.

FIG. 2 is a diagram of the components of a communication bridging platform 103, according to one embodiment. By way of example, the communication bridging platform 103 includes one or more components for bridging communication sessions among multiple devices. It is contemplated that the functions of these components may be combined in one or more components or performed by other components of equivalent functionality. As shown in FIG. 2 and as described with respect to FIG. 1, the communication bridging platform 103 interacts with the members list database 111, the contact list databases 107, the web service contact list database 115, or any combination thereof to perform its bridging functions. In one embodiment, the communication bridging platform 103 includes a control logic 201 which executes at least one algorithm for executing functions of the communication bridging platform 103. For example, the control logic 201 interacts with a graphical user interface (GUI) module 203 to present a graphical user interface representing, for instance, contacts and/or their corresponding UEs 101.

In one embodiment, the GUI module 203 presents the GUI or causes the GUI to be presented at a UE 101*c* that can act as bridging device for an originating device (e.g., UE 101*a*) that is attempting to establish a communication session with a terminating device (e.g., UE 101*b*). In this example, the UE 101*c* is able to act as a bridging device because it has static links with both the UE 101*a* and UE 101*b* in its contact list database 107*c*. As discussed previously, one way to establish a static is by storing a permanent communication identifier (e.g., contact information such as a telephone number, e-mail address, and the like) of another device within a first device's contact list. By using, for instance, the drag-and-drop process described above, the GUI 203 receives a request for the UE 101*c* to bridge a communication session between the UEs 101*a* and 101*b*.

In some embodiments, the GUI module 203 may interact with a device determination module 205 to query for or determine a suitable bridging device. For example, the device determination module 205 may query the contact list databases 107*a*-107*b* of the UEs 101*a*-101*b*, the members list 111, the web service contact list 115, or any combination thereof to determine one or more candidate bridging devices (e.g., one or more UEs 101*a*-110*n*) that have static links with the originating device (e.g., UE 101*a*) and the terminating device (e.g., UE 101*b*). If more than one candidate bridging device is discovered, the device determination module 205 can apply one or more selection criteria (e.g., proximity to the UEs 101*a* and 101*b*, closeness of relationships, device capabilities, connectivity, availability, etc.) to determine which of the candidate devices to select to perform the bridging. In certain embodiments, the device determination module 205 may select more than one bridging device to facilitate the communication.

Following determination of which device is to act as the bridging UE 101*c*, the device determination module 205 interacts with the identifier generator 207 to generate temporary identifiers to associate with the originating UE 101*a* and the terminating UE 101*b*. In one embodiment, the identifier generator 207 may determine the format of the temporary identifiers based, at least in part, on the form of communication that is to be used to conduct the communication session. For example, if the communication session is a voice call, the temporary identifier may be in the format of a telephone number. Similarly, if the communication session is an e-mail, the temporary identifier may be formatted as an e-mail address. In some embodiments, the identifier generator may also generate metadata or other related information to associate a relationship of the bridging UE 101c with the temporary identifiers. This relationship information can be used by the originating UE 101a and/or terminating UE 101b to evaluate whether to accept or reject the temporary communication link. In this way, the identifier generator 207 can advantageously reduce the potential for creating unwanted links between the UEs 101a and 101b.

Next, the identifier generator 207 interacts with a temporary link module 209 to cause transmission of the temporary identifiers to the originating UE 101a and the terminating UE 101b. In one embodiment, the transmissions of the identifiers occur over the static links between the bridging UE 101c and each of the originating UE 101a and the terminating UE 101b. Because the temporary link identifies only the temporary identifiers of the originating UE 101a and the terminating UE 101b, the originating UE 101a and the terminating UE 101b have the opportunity to initiate the communication session without revealing any permanent and/or private communication identifiers.

On acceptance or approval of the temporary communication link by either or both of the originating UE 101a and the terminating UE 101b, the temporary link module 209 directs the static link module 211 to convert the temporary link to a static link. As noted previously, a static link can be formed by exchanging and/or storing the permanent communication identifier of another device. In some embodiments, the static link module 211 can create a unilateral static link in which only one of the originating UE 101a or terminating UE 101b establishes a static link with the other. For example, the static link module 211 may create a static link between the UE 101a and UE 101b only at the originating UE 101a by storing the permanent identifier of the terminating UE 101b in the contact list 107a of the UE 101a. In other embodiments, the static link manager 211 may create a bilateral static link whereby the originating UE 101a and the terminating UE 101b exchange respective permanent communication identifiers so that future communications may occur over the static link.

Figure 3:
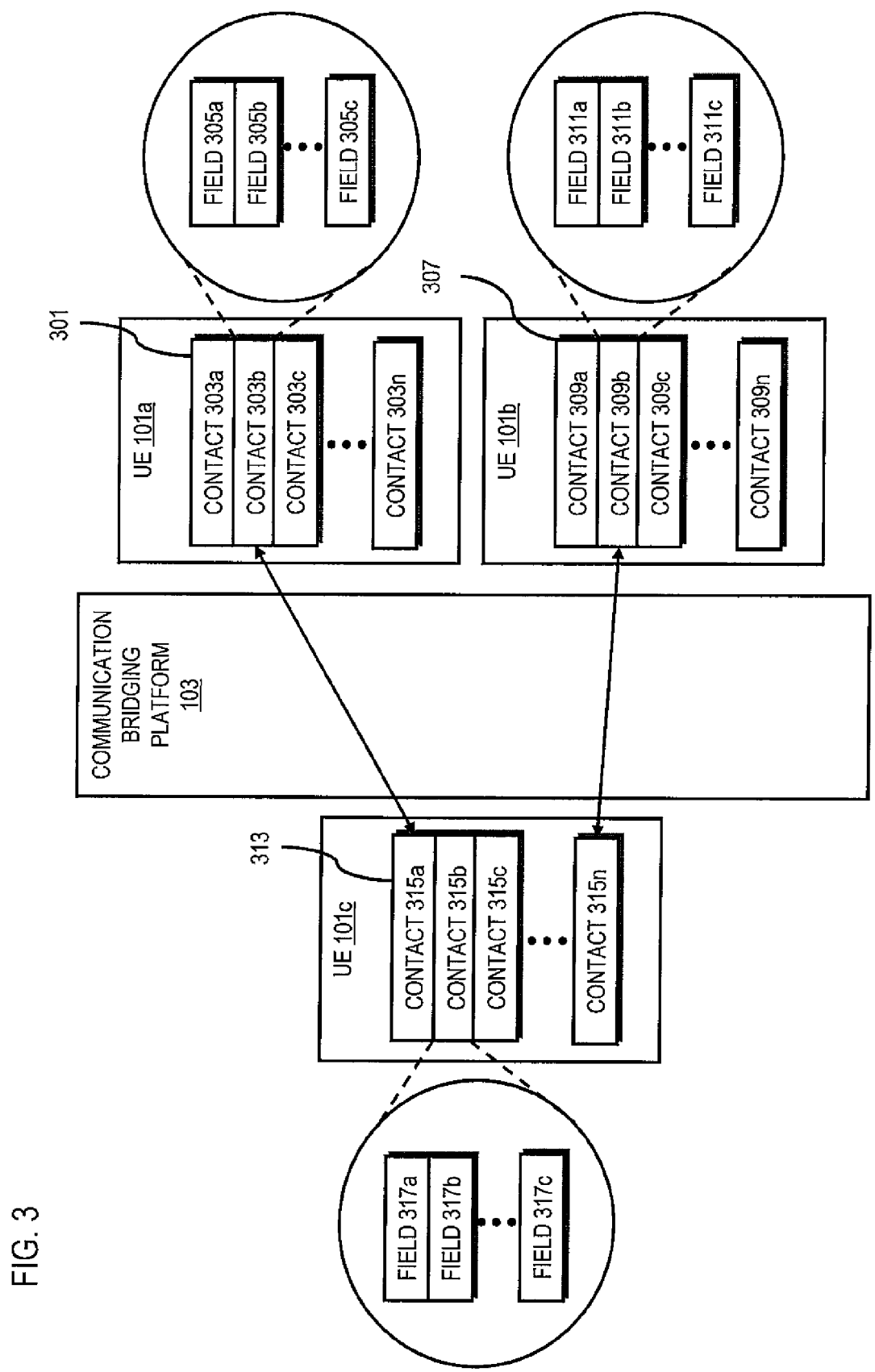
FIG. 3 is a diagram of the data structure of respective contact lists of devices utilized in the system of FIG. 1, according to one embodiment.

FIG. 3 is a diagram of the data structure of respective contact lists of devices utilized in the system of FIG. 1, according to one embodiment. As in typical database management systems, data can be stored in one or more data containers, each container contains records, and the data within each record is organized into one or more data fields. As shown in FIG. 3, a UE 101a (e.g., an originating device), a UE 101b (e.g., a terminating device), and a UE 101c (e.g., a bridging device) each include respective data containers comprising contact records representing each entry of respective contact lists. More specifically, the UE 101a includes a contact list data container 301 corresponding to, for instance, either the contact list database 107a, the social networking members list 111, or the web service contact list database 115. The contact list data container 301 includes contact records 303a-303n representing each entry of a corresponding contact list. Further, each contact 303 may be broken down into data fields 305a-305c correlating to various parameters that describe a contact (e.g., name, telephone number, E-mail address, hobbies, interests, characteristics). In this regard, the number of data fields 305a-305n, is dependent on the level of detail that the user, social networking service 109, and/or web service 113 would like to maintain. Hence, it is possible for two different contact lists to have different data fields.

Similarly, the terminating UE 101b includes a contact list data container 307 including contact records 309a-309n representing each entry of a corresponding contact list. Each contact 309 consisting of data fields 311a-311n that are similar to the data fields 305a-305c. The bridging UE 101c also includes a contact list data container 313 including contact records 315a-315n within each contact 315 consisting of data fields 317a-317c. It is contemplated that the contact lists of the originating UE 101a, the terminating UE 101b, and the bridging UE 101c may include number of records, have different data fields, and provide information of different levels of detail.

As shown in FIG. 3, the communication bridging platform 103 provides the logic for matching entries in the contact list data containers 301, 307, and 313 for determining whether there are static links among the UEs 101a-101c. As described previously, the data fields between contact lists of the UEs 101a-101c may differ depending on the level of detail desired for or captured in the respective lists. In addition, different services (e.g., the social networking service 109, web service 113, and UE 101) may name each data field differently even though they might contain the same or similar information. For example, the name field 305a in the contact list data container 301 may be called "NAME" whereas the equivalent data field in the members list data container 307 may be called "FULL NAME." Accordingly, it is contemplated that the communication bridging platform 103 includes logic to either automatically or with user input correlate fields among the contact lists of the UEs 101a-101c to bridging of communication sessions.

As part of the communications bridging process, the communication bridging platform 103, for instance, compares records in the contact list of the originating UE 101a against the records of the contact list of the bridging UE 101c to determine whether there is a static link between the two (e.g., whether the contact list of one device includes contact information for the other device). The communication bridging platform 103 also compares the contact list of the terminating UE 101b against the records of the contact list of the bridging UE 101c. In one embodiment, the comparison includes retrieving information from the data fields 305 of the contact list data container 301, the data fields 311 of the contact list data container 307, and the data fields 317 of the contact list data container 313 for determining the existence of a static link (e.g., storage of a communication identifier such as a name, telephone number, e-mail address, etc.). As shown, the communication bridging platform 103 matched contact 303b with contact 315a to determine a static link between the originating UE 101a and the bridging UE 101c; and matched contact 309b with contact 315n to determine a static link between the terminating UE 101b and the bridging 101c. Accordingly, under the approach described herein, the bridging UE 101c may act as a communications bridge or mediator between the originating UE 101a and the terminating UE 101b.

Figure 4:
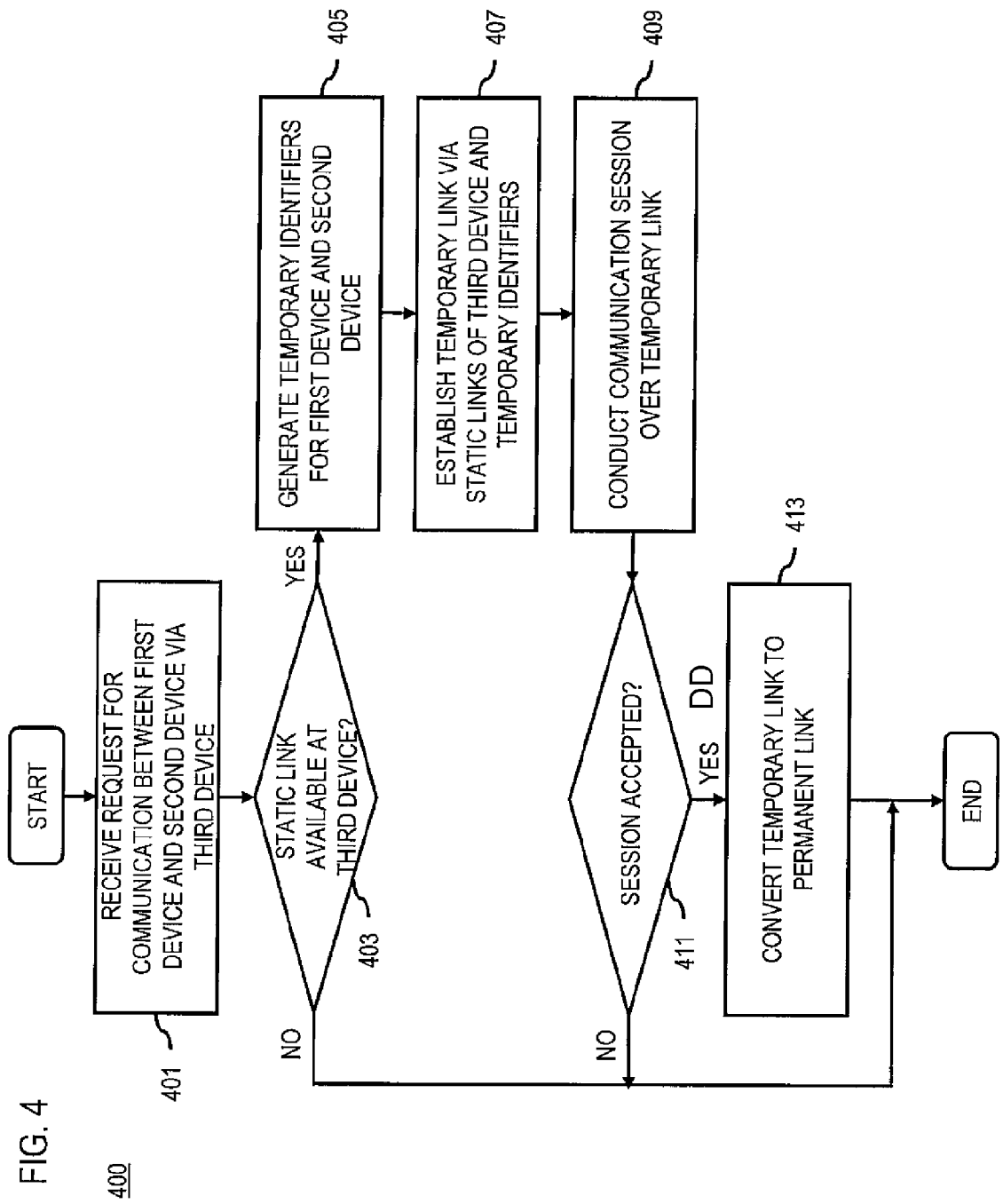
FIG. 4 is a flowchart of a process for bridging communication sessions among multiple devices, according to one embodiment.

FIG. 4 is a flowchart of a process for bridging communication sessions among multiple devices, according to one embodiment. In one embodiment, the communication bridging platform 103 performs the process 400 and is implemented in, for instance, a chip set including a processor and a memory as shown FIG. 8. In addition or alternatively, the communication bridging client application 117 may perform all or a portion of the process 400. By way of example, the communication bridging client application 117 may be executed by an originating UE 101a, a terminating UE 101b, and/or a bridging UE 101c. In step 401, the communication bridging platform 103 receives or determines to receive a request for establishing a communication session between a first device (e.g., an originating UE 101a) and a second device (e.g., a terminating UE 101b). In one embodiment, the request specifies, at least in part, a third device (e.g., a bridging UE 101c) with a first static link to the first device and a second static link to the second device. In certain embodiments, the request need not specify the bridging UE 101c. Instead, the communication bridging platform can determine the bridging UE 101c as described with respect to FIG. 5 below. In one embodiment, the requested communication session includes a voice call, an electronic mail, an instant message, a text message, a multimedia message, a social-networking message, a chat session, a video call, or a combination thereof. It is also contemplated that the communication session can include any other means of communication available over the communication network 105.

If a bridging device UE 101c with the appropriate static links is not available (step 403), the process ends. Otherwise, the communication bridging platform 103 generates or determines to generate one or more temporary identifiers that are associated with at least one of the originating UE 101a and the terminating UE 101b (step 405). As discussed previously, the temporary identifiers enable the communication bridging platform 103 to establish a temporary link between the originating UE 101a and the terminating UE 101b via the first static link (e.g., the static link between the bridging UE 101c and the originating UE 101a) and the second static link (e.g., the static link between the bridging UE 101c and the terminating UE 101b) (step 407). By way of example, the transmission of the temporary identifier facilitates identification of the temporary link by the participating UEs 101a-101c. In some embodiments, the communication bridging platform 103 need not identify the temporary link using the temporary identifiers and can instead establish the temporary link with no identifiers or alternates to identifiers such as flags.

In addition or alternatively, the communication bridging platform 103 may identify the temporary link based, at least in part, on a static identifier associated with the bridging UE 101a. In this way, the UEs 101a and 101b may receive an indication of how and/or for what purpose the temporary link is being established. With respect to an example of a voice call, identifying the temporary link based on the bridging UE 101a is equivalent to stating that "Our friend John gave me your phone number, so that I can contact you."

After establishing and optionally identifying the temporary link, the communication bridging platform 103, conducts the requested communication session over the temporary link (step 409). At this point, the communication session has just been initiated, but not yet formally accepted or approved. Accordingly, the communication bridging platform determines whether the originating UE 101a and/or the terminating UE 101b accepts the communication session (step 411). As used herein, acceptance may be indicated if either the UE 101a or UE 101b answers the communication session. For example, if the example of an example IM session, the UE 101a and UE 101b can accept/approve by typing a message in the IM session initiated by the communication bridging platform 103. In the context of e-mail, acceptance may be provided by replying to an initiating e-mail from the communication bridging platform 103. If the UEs 101a and 101b do not accept the communication session the process ends and the temporary link is terminated. If the UE 101a and/or the UE 101b accepts the communication, the communication bridging platform 103 converts the temporary link to a direct static link between the originating UE 101a and the terminating UE 101b (step 413). In one embodiment, to convert to the static link, the communication bridging platform 103 exchanges or determines to exchange permanent or static identifiers associated respectively with the originating UE 101a and the terminating UE 101b for storage at the devices. In this way, one or both of the devices will have permanent communication identifier that can be used to contact the other device directly without the bridge. It is noted that in some embodiments where the originating UE 101a has directly initiated the communication request, the UE 101a need not approve the communication session. Instead, approval from just the terminating UE 101a is sufficient to convert the temporary link into a static link. In other words, the conversion of the temporary link to the static link may also happen in the UE101a and 101b without any external approval of any communication bridging platform 103.

Figure 5:
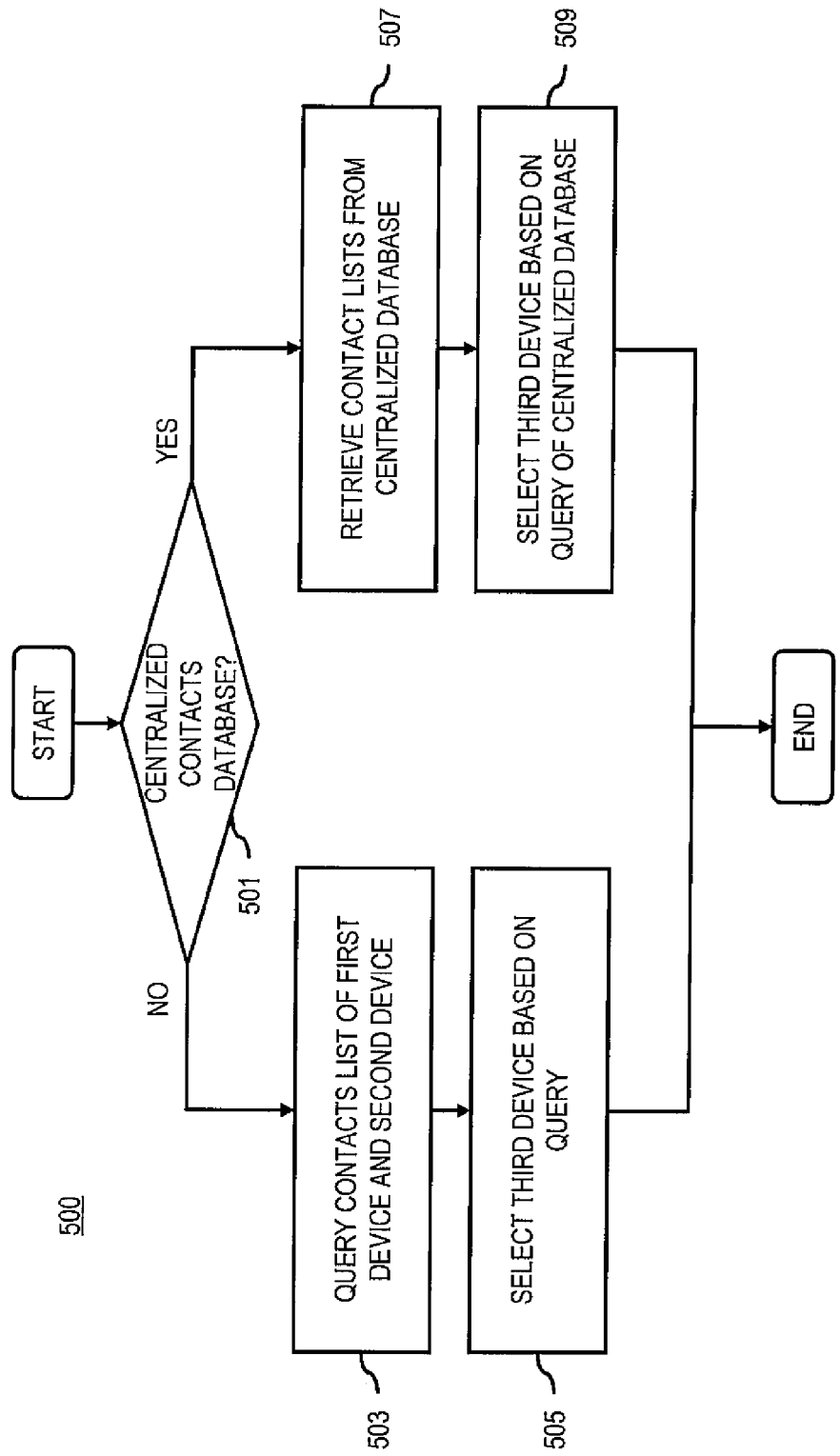
FIG. 5 is a flowchart of a process for determining a communications bridge device, according to one embodiment.

FIG. 5 is a flowchart of a process for determining a communications bridge device, according to one embodiment. In one embodiment, the communication bridging platform 103 performs the process 500 and is implemented in, for instance, a chip set including a processor and a memory as shown FIG. 8. In addition or alternatively, the communication bridging client application 117 may perform all or a portion of the process 500. By way of example, the communication bridging client application 117 may be executed by an originating UE 101a, a terminating UE 101b, and/or a bridging UE 101c. It is contemplated that the process 500 can be performed independently or in conjunction with the process 400 of FIG. 4 described above to identify candidate bridging devices that have static links with one or other UEs 101 available for bridging. At step 501, the communication bridging platform 103 determines whether there is a centralized database of contact lists from a group of devices available for access. In one embodiment, the centralized database is part of an auxiliary service that aggregates and compiles contact lists.

If no centralized database is available or the communication bridging platform 103 is otherwise configured not to access the database, the communication bridging platform 103 can determine potential bridging devices by querying or determining to query one or more contact lists 107 corresponding to the originating UE 101a and/or the terminating UE 101b to determine whether any of the contacts are common to both the UE 101a and the UE 101b (step 503). Such a device would have contact information (i.e., a static link) for communication with the UEs 101a and 101b. The communication bridging platform 103 can then select one or more bridging devices based, at least in part, on the query (step 505). If more than one candidate device is available, the communication bridging platform 103 can apply one or more selection criteria as previously described.

If a centralized database is available, the communication bridging platform 103 can query the database directly for potential bridging devices (step 507). By way of example, the query may specify, for instance, the originating UE 101a and the terminating UE 101a so that any UE 101 associated with a contact list including both devices can be a potential candidate bridging device. A centralized database enables the communication bridging platform 103 to advantageously search multiple devices more quickly and efficiently for potential candidate bridging devices. As described above, the communication bridging platform can then select one or more bridging devices based, at least in part, on the query of the centralized database. Similarly, if more than one candidate device is available, the communication bridging platform 103 can apply one or more selection criteria as previously described.

Figure 6:
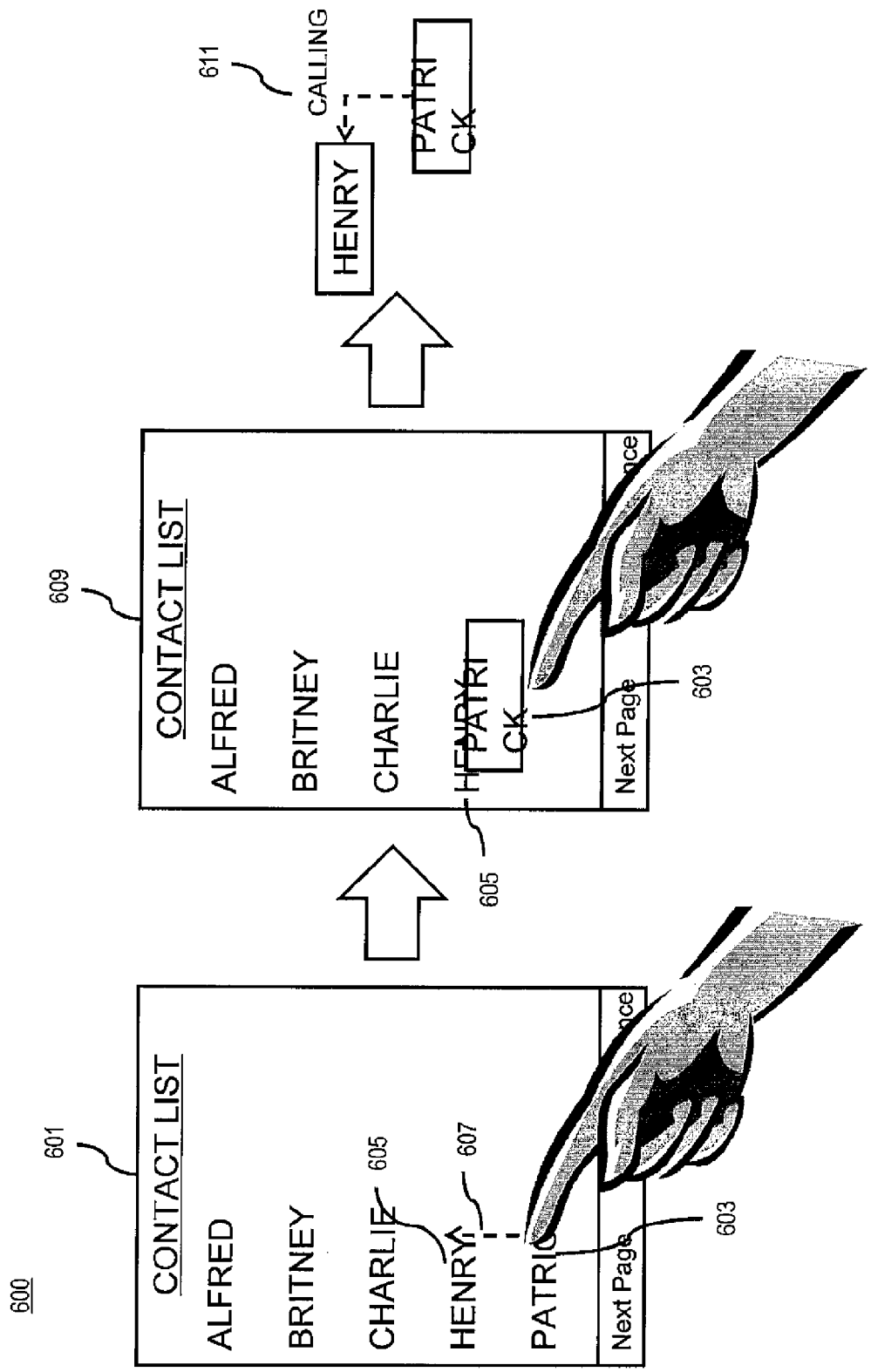
FIG. 6 is a diagram of a user interface utilized in the processes of FIGS. 4 and 5, according to one embodiment.

FIG. 6 is a diagram of a user interface utilized in the processes of FIGS. 4 and 5, according to one embodiment.

FIG. 6 depicts a user interface 600 for initiating a request to bridge as communication session between an originating UE 101a and a terminating UE 101b. In one embodiment, as part of the communication bridging process, the communication bridging platform 103 can present a GUI including, at least in part, one or more representations of the originating UE 101a, the terminating UE 101b, and/or the bridging UE 101c. As shown, a screen 601 depicts a GUI at bridging UE 101c for bridging a communication session. The GUI includes a depiction of the contact list of the bridging UE 101c. In this example, the bridging UE 101c has received a request from the originating UE 101a associated with a contact 603 named "Patrick" to bridge a communication session with the terminating UE 101b associated with a contact 605 named "Henry." In response, a user of the bridging UE 101c makes a gesture 607 moving the contact 603 towards the contact 605. Alternatively, a user of the bridging UE 101c may create a bridge between the UE 101a and the UE 101b at the user's own initiative. In an additional embodiment, the user may create and/or attach a message to the association to be delivered together with the static links.

In one embodiment, the communication bridging platform 103 determines or detects one or more movements (e.g., gesture 607) of the one or more representations of the UEs 101a and UE 101b (e.g., contact 603 and contact 605). These movements or gestures can initiate the bridging request. By way of example, the one or more movements include moving at least one of the one or more the representations to indicate at least a partial overlap with another one of the one or more representations. As shown in screen 609, the gesture 607 has resulted in moving or dragging of the contact 603 so that it is dropped on the contact 605 to create an overlap, thereby initiating the bridging request. The request, in turn, initiates the bridging process as described with respect to FIGS. 4 and 5 and a bridged communication session 611 (e.g., a voice call) is initiated between Patrick and Henry via the static links of the bridging UE 101c.

The processes described herein for bridging communication sessions among multiple devices may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
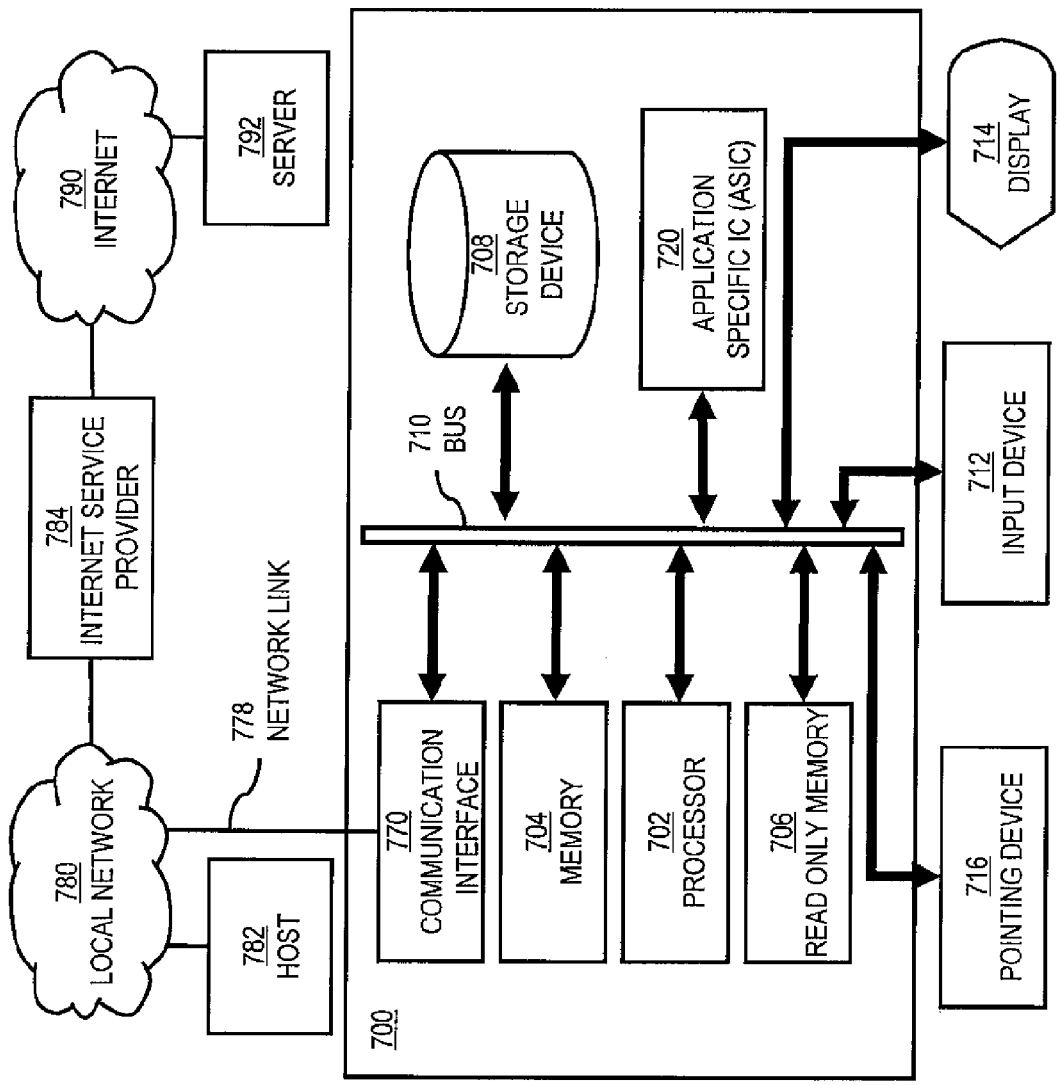
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to bridge communication sessions among multiple devices as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of bridging communication sessions among multiple devices.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to bridging communication sessions among multiple devices. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for bridging communication sessions among multiple devices. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for bridging communication sessions among multiple devices, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for bridging communication sessions among multiple devices.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
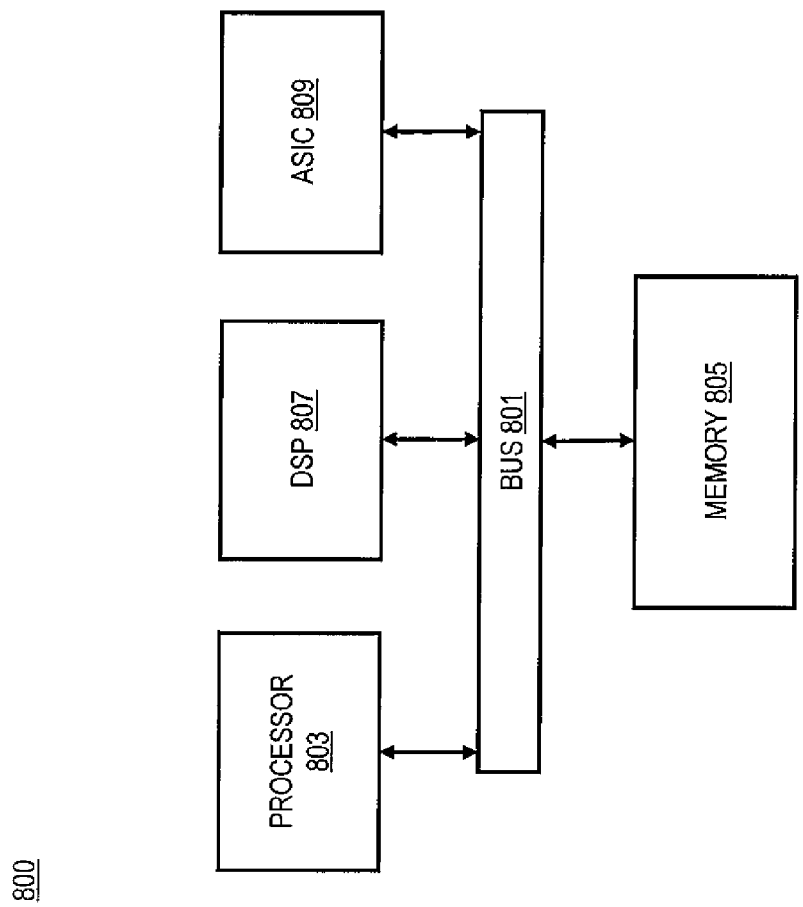
FIG. 8 is a diagram of a chip set that can be used to implement an embodiment of the invention.

FIG. 8 illustrates a chip set or chip 800 upon which an embodiment of the invention may be implemented. Chip set 800 is programmed to bridge communication sessions among multiple devices as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of bridging communication sessions among multiple devices.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to bridge communication sessions among multiple devices. The memory 805 also stores the data associated with or generated by the execution of the inventive steps.

Figure 9:
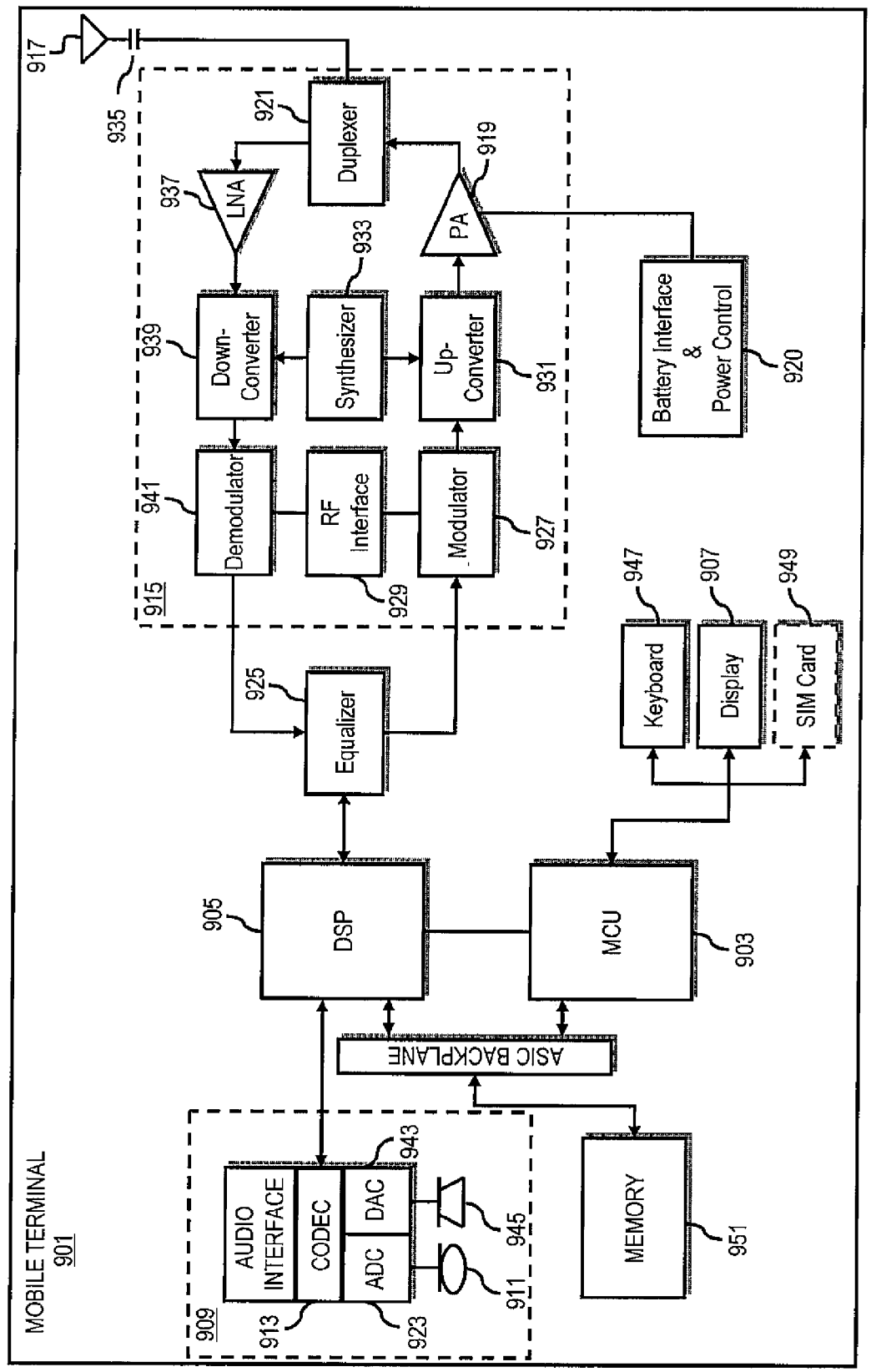
FIG. 9 is a diagram of a mobile station (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of bridging communication sessions among multiple devices. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of bridging communication sessions among multiple devices. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to bridge communication sessions among multiple devices. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining to receive a request for establishing a communication session between a first device and a second device, wherein the request specifies, at least in part, a third device with a first static link to the first device and a second static link to the second device:
   determining to establish a temporary link between the first device and the second device via the first static link and the second static link for conducting the communication session;

determining to present a graphical user interface including, at least in part, one or more representations of at least one of the first device, the second device, and the third device; and determining one or more movements of the one or more representations, wherein the one or more movements initiates the request, and wherein the one or more movements include moving at least one of the one or more representations to indicate at least a partial overlap with another one of the one or more representations.

2. A method of claim 1, further comprising:

determining whether at least one of the first device and the second device accepts the communication session over the temporary link; and determining to convert the temporary link to a third static link between the first device and the second device.

3. A method of claim 2, further comprising:

determining to generate one or more temporary identifiers associated with at least one of the first device and the second device; and determining to identify the temporary link based, at least in part, on the one or more temporary identifiers.

4. A method of claim 2, further comprising:

determining to exchange a first static identifier associated with the first device and a second static identifier associated with the second device between the first device and the second device, wherein the exchange initiates actions that result in formation of the third static link.

5. A method of claim 1, further comprising:

determining to identify the temporary link based, at least in part, on a third static identifier associated with the third device.

6. A method of claim 1, further comprising:

determining to query one or more contact lists associated with at least one of the first device and the second device for at least one of the first static link and the second static link; and select the third device based, at least in part, on the query.

7. A method of claim 1, further comprising:

determining to retrieve one or more contact lists associated with at least one of the first device, the second device, and the third device;

determining to store the one or more contact lists in a database; and determining to query the database to select the third device.

8. A method of claim 1, wherein the communication session includes a voice call, an electronic mail, an instant message, a text message, a multimedia message, a social-networking message, a chat session, a video call, or a combination thereof.

9. An apparatus comprising:

at least one processor; and at least one memory including computer program code for one or more programs, the at least one memory and the computer program code configured to, with the at least one processor, cause the apparatus to perform at least the following, determine to receive a request for establishing a communication session between a first device and a second device, wherein the request specifies, at least in part, a third device with a first static link to the first device and a second static link to the second device;

determine to establish a temporary link between the first device and the second device via the first static link and the second static link for conducting the communication session;

determine to present a graphical user interface including, at least in part, one or more representations of at least one of the first device, the second device, and the third device; and determine one or more movements of the one or more representations, wherein the one or more movements initiates the request, and wherein the one or more movements include moving at least one of the one or more representations to indicate at least a partial overlap with another one of the one or more representations.

10. An apparatus of claim 9, wherein the apparatus is further caused to:

determine whether at least one of the first device and the second device accepts the communication session over the temporary link; and determine to convert the temporary link to a third static link between the first device and the second device.

11. An apparatus of claim 10, wherein the apparatus is further caused to:

determine to generate one or more temporary identifiers associated with at least one of the first device and the second device; and determine to identify the temporary link based, at least in part, on the one or more temporary identifiers.

12. An apparatus of claim 10, wherein the apparatus is further caused to:

determine to exchange a first static identifier associated with the first device and a second static identifier associated with the second device between the first device and the second device, wherein the exchange initiates actions that result in formation of the third static link.

13. An apparatus of claim 9, wherein the apparatus is further caused to:

determine to identify the temporary link based, at least in part, on a third static identifier associated with the third device.

14. An apparatus according to claim 9, wherein the apparatus is further caused to:

determine to query one or more contact lists associated with at least one of the first device and the second device for at least one of the first static link and the second static link; and select the third device based, at least in part, on the query.

15. An apparatus of claim 9, wherein the apparatus is further caused to:

determine to retrieve one or more contact lists associated with at least one of the first device, the second device, and the third device;

determine to store the one or more contact lists in a database; and determine to query the database to select the third device.

16. An apparatus of claim 9, wherein the communication session includes a voice call, an electronic mail, an instant message, a text message, a multimedia message, a social-networking communication session, a chat session, a video call, or a combination thereof.

17. A non-transitory computer-readable storage medium carrying one or more sequences of one or more instructions which, when executed by one or more processors, cause an apparatus to perform at least the following steps:

determining to receive a request for establishing a communication session between a first device and a second device, wherein the request specifies, at least in part, a third device with a first static link to the first device and a second static link to the second device;

determining to establish a temporary link between the first device and the second device via the first static link and the second static link for conducting the communication session;

determining to present a graphical user interface including, at least in part, one or more representations of at least one of the first device, the second device, and the third device; and determining one or more movements of the one or more representations, wherein the one or more movements initiates the request, and wherein the one or more movements include moving at least one of the one or more representations to indicate at least a partial overlap with another one of the one or more representations.

\* \* \* \* \*